(12) United States Patent
Jacobson

(10) Patent No.: US 7,840,877 B2
(45) Date of Patent: Nov. 23, 2010

(54) MASS STORAGE SYSTEM AND METHOD

(75) Inventor: Michael B. Jacobson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1058 days.

(21) Appl. No.: 11/590,129

(22) Filed: Oct. 31, 2006

(65) Prior Publication Data
US 2008/0104484 A1    May 1, 2008

(51) Int. Cl.
*G11C 29/00* (2006.01)
(52) U.S. Cl. .................... 714/770; 711/114
(58) Field of Classification Search .............. 714/770; 711/111, 114
See application file for complete search history.

(56) References Cited
U.S. PATENT DOCUMENTS

| | | | | |
|---|---|---|---|---|
| 6,145,069 A | * | 11/2000 | Dye | 711/170 |
| 6,532,121 B1 | * | 3/2003 | Rust et al. | 360/8 |
| 2006/0005069 A1 | * | 1/2006 | Gaertner | 714/5 |

* cited by examiner

*Primary Examiner*—Sam Rizk

(57) ABSTRACT

There is provided a system and method of mass storage. The method includes dividing storage units into standard size blocks and upon receiving a write request from an application, generating EDC data for user application data associated with the write request. The method also includes compressing the user application data using a lossless compression technique and storing the user application data and the EDC data together in a single block in a primary data area if the lossless compression technique is successful.

19 Claims, 4 Drawing Sheets

MASS STORAGE SYSTEM AND METHOD

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Over the past several decades, computer technologies have become increasingly sophisticated. Additionally, with advancements in networking, computer systems are used in an increasing number of applications and are common tools used in businesses, schools, and homes. Indeed, computer systems have become easier to use and more capable as technologies have been developed to accommodate current and future demands. In particular, mass storage technologies have been developed to increase the storing capacity and speed of access of digital data used by applications operating on the computer systems.

A typical mass storage system may include a redundant array of inexpensive disks commonly referred to as a RAID array. The RAID array may be implemented to increase the performance and reliability of a mass storage device. A RAID array implements a redundant architecture using a memory controller commonly referred to as a RAID controller. The RAID controller controls the writing of data to and the reading of data from the RAID array. In a standard configuration, the storage units of the RAID array are divided into blocks of 512 bytes. Accordingly, in a RAID system, user applications typically are designed to write and read data in blocks of 512 bytes.

In some implementations the RAID controller generates error detection code (EDC) data when writing data to the RAID array in order to verify the integrity of the data when it is read back from the storage units by an application. The EDC data is typically eight bytes long and, because of the block size, it is not stored with its corresponding user application data, as the user application data completely fills an entire block. During a read operation, therefore, the user application data is retrieved from one location and the EDC data is retrieved from another. Because the RAID controller accesses two separate storage locations per read operation, performance degradation can occur. In order to alleviate the performance degradation, an alternative method modifies the size of the blocks to allow for EDC data to be stored with the application data. However, altering the block size may incur increased costs and complications. For example, some disk interface technologies may not support the altered block size, resulting in compatibility issues.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A system and method for increasing performance of mass memory systems is provided. The disclosed system and method implement lossless data compression techniques to compress user application data. In instances where the lossless data compression successfully compresses the application data, error detection code (EDC) data is stored in the same block as the user application data. Implementation of this technique reduces performance degradation by allowing for the retrieval of the EDC data from the same block as the user application data. Furthermore, the technique does not require reconfiguration of data block sizes and, thus, is compatible with standard disk interfaces.

Figure 1:
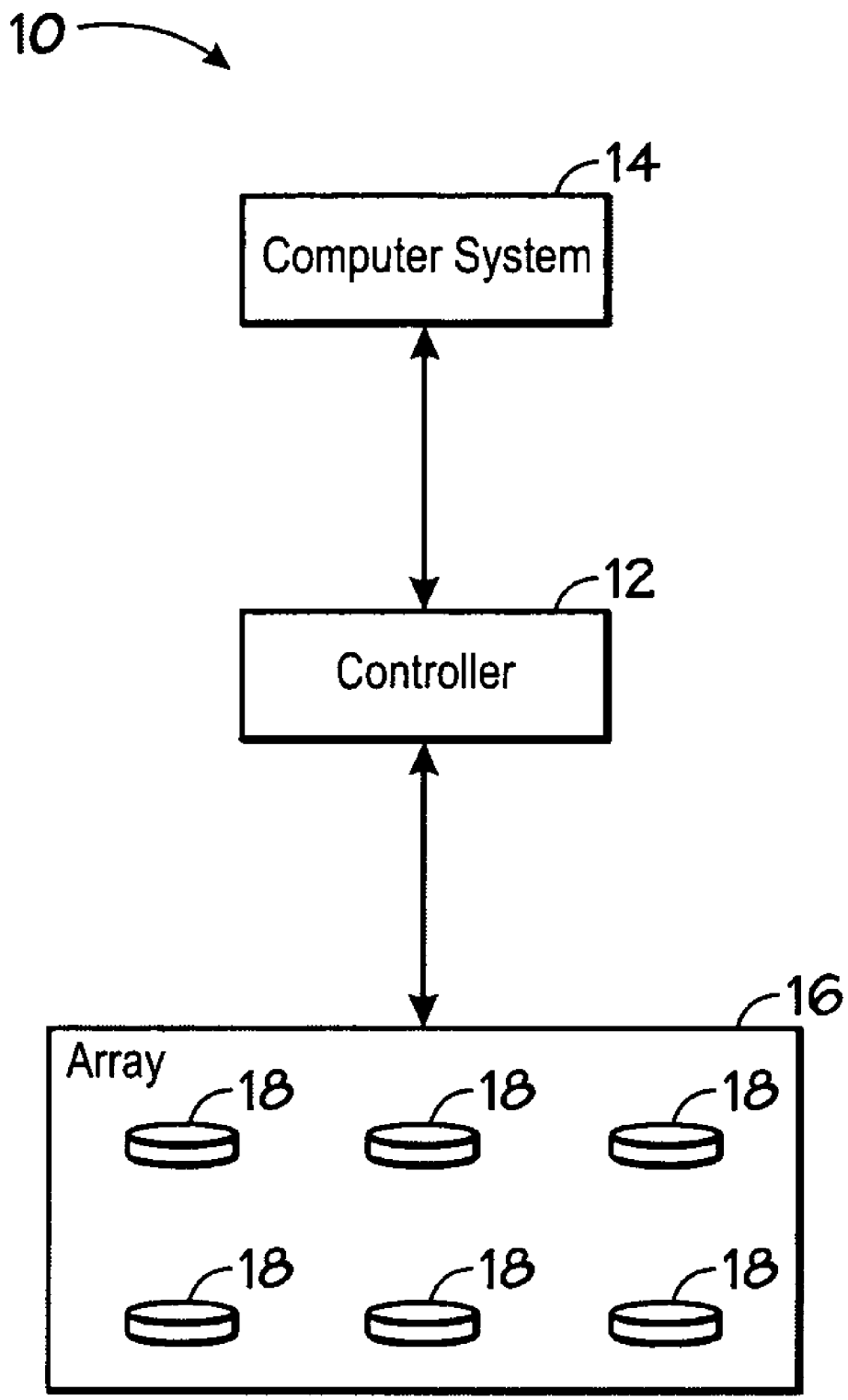
FIG. 1 illustrates a block diagram of RAID system according to an exemplary embodiment of the present invention.

Turning to FIG. 1, a mass storage system is illustrated in accordance with an exemplary embodiment of the present invention and is generally designated by the reference numeral 10. The mass storage system 10 may have a RAID controller 12 which is communicatively coupled with a computer system 14. The computer system 14 may be implemented as a workstation, a personal computer, a server, a network of computer devices, or other similar computing device or structure.

The computer system 14 may be configured to execute user applications, such as word processors, spreadsheets, and media players, for example. Accordingly, the computer system 14 may have one or more processors and memory devices to execute the user applications. Additionally, the computer system 14 may have one or more peripheral devices which allow for a user to interface the computer system 14. During execution of the user applications, the user applications may store data to and read data from an array 16 of the mass storage system 10.

During a write operation, as user application data passes through the RAID controller 12, EDC data is generated for the user application data. The EDC data is typically an eight byte block of check code for the user application data. The EDC data is associated with the user application data when it is stored in the array 16 and, during a read operation k, the EDC is read back with the user application data so the integrity of the user application data can be verified.

The array 16 may be made up of a plurality of storage units 18. The storage units 18 may be magnetic drives, optical drives, or semiconductor memory, for example. The storage units 18 of the mass storage system 10 are configured by the RAID controller 12 to operate according to a well-known RAID architecture, such as RAID level 4. The RAID controller 12 may logically divide the storage units 18 into uniformly sized sectors or blocks for the storage of user application data. The standard size for blocks is 512 bytes and, as such, user applications typically generate blocks of data for storage in 512 byte blocks. As will be discussed in greater detail below, a lossless data compression may be used to compress the user application data to allow for the storage of the EDC code in the same data block as the user application data.

The storage units 18 may be coupled to the RAID controller 12 via a disk interface, such as a small computer system interface (SCSI), fiber channel, serial AT attachment (SATA), AT attachment (ATA), or Serial Attached SCSI (SAS). The SATA, ATA, and SAS interfaces may be lower cost disk interface technologies and may provide higher data rates, but due to market dynamics it is uncertain whether they support non-standard sized blocks. Accordingly, reformatting the block sizes from 512 bytes to other sizes, such as 520 bytes for example, may not be a viable solution due to compatibility and cost considerations.

Figure 2:
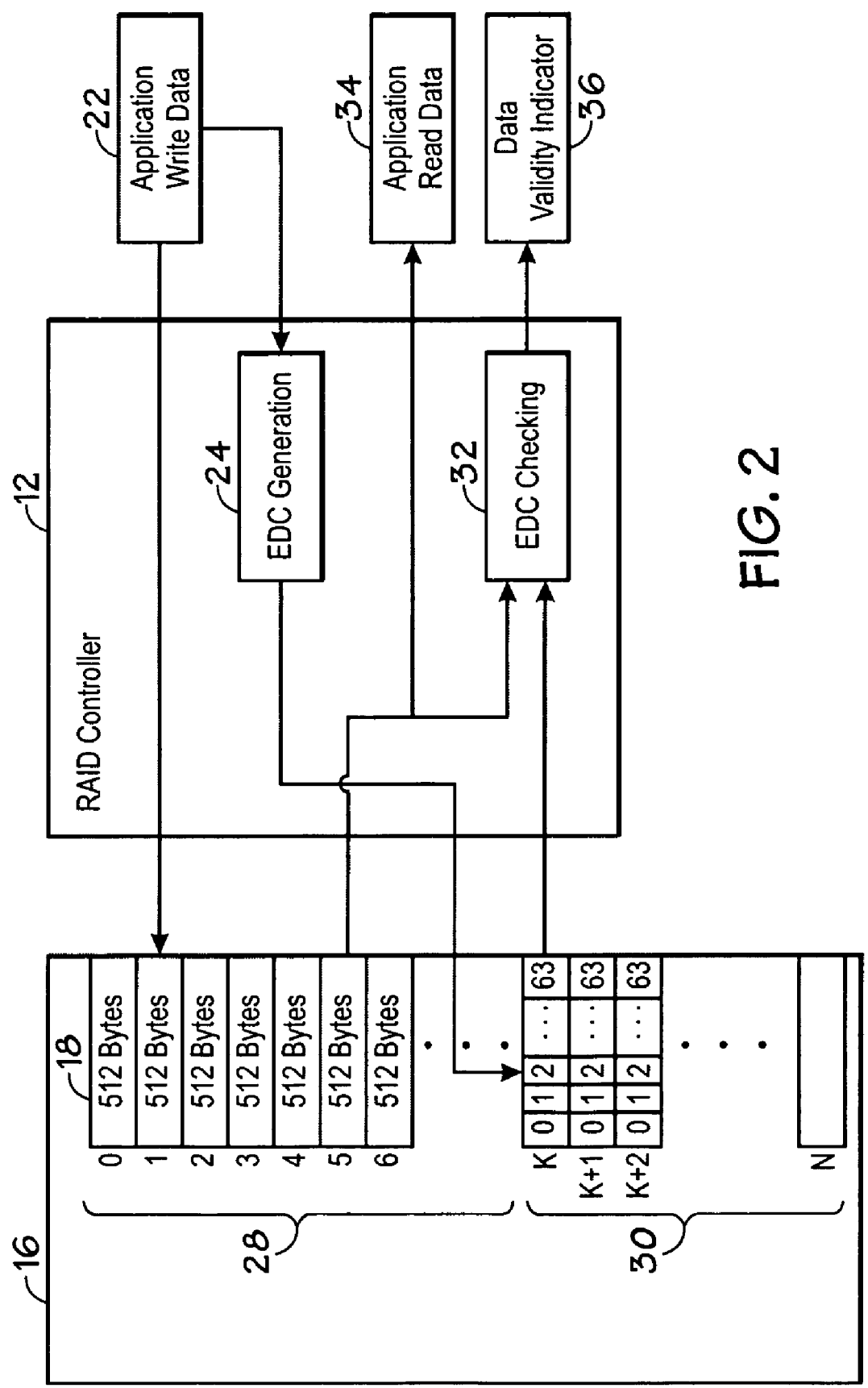
FIG. 2 illustrates a block-flow diagram of a RAID system configured to store check data and application data in separate blocks.

A block-flow diagram illustrating storage and retrieval of data from the array 16 is illustrated in FIG. 2. Specifically, FIG. 2 illustrates the practice of storing EDC data in a separate block from the user application data. A write data block 22 having 512 bytes of data is received at the RAID controller 12 from a user application. The RAID controller 12 generates EDC data using an EDC machine 24. As mentioned above, the generated EDC data is check code for the user application data and may be eight bytes long. The write data block 22 and the EDC data are passed from the RAID controller 12 to the array 16.

The array 16 has a storage unit 18 having N number of blocks. Each of the blocks is standard size, having 512 bytes of available storage space, and has an associated address or index number associated with it. For example, the first block in the storage unit may be numbered "0." The write application data 22 is stored in an application data area 28, while the EDC data is stored in a check data area 30. Because the EDC data is eight bytes long per write data block 22, each block in the check data area 30 may store 64 sets of EDC data per standard sized block.

The write data block 22, having user application data, may be associated with its corresponding EDC data using a simple addressing scheme. For example, the check data area 30 may be defined as disk block index K plus the application data area block index number divided by 64. The check data segment index may be defined as application data area block index number MOD 64. Thus, during a read operation, the appropriate EDC data is retrieved for the requested user application data.

During a read operation, an EDC check engine 32 may be used to determine the validity of the data and to generate a data validity indicator 36. The RAID controller 12 produces a data validity indicator 36 along with the read data 34 for each read operation. Because both the EDC data and the user application data are accessed and each are stored in separate blocks, a higher utilization of disk performance results. Specifically, higher performance utilization of the storage unit 18 for a given user application access results in a lower maximum performance level for the storage array 16 and, consequently, a reduced performance level for the mass storage system 10.

In order to increase the performance of the storage array 16, a lossless compression technique may be implemented to allow for the EDC data to be stored in the same block as the user application data. Specifically, by implementing lossless techniques, the block space needed in a standard sized block to store user application data is reduced, allowing room for the EDC data. A lossless compression technique is used instead of lossy compression techniques because lossless techniques provide an exact reproduction of the user application data. Data loss that may result when using a lossy technique may cause errors to occur in user applications when the data is read back by the user application. Because a lossless data compression technique is implemented, however, the data compression of the user application data may not always be successful. In such instances, the EDC data and the user application data are stored in separate blocks, as will be discussed in detail below.

Figure 3:
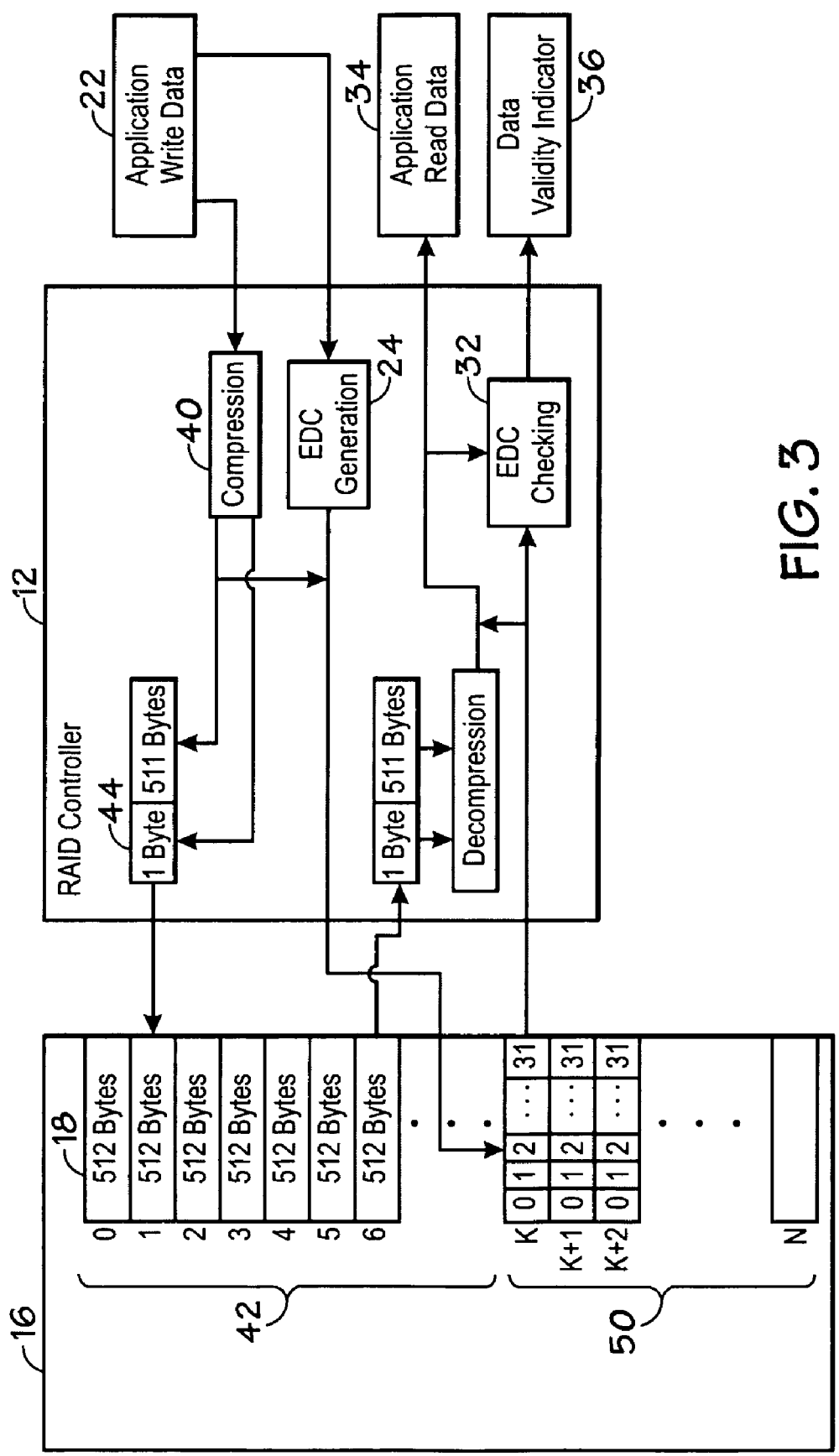
FIG. 3. illustrates a block-flow diagram of the RAID system of FIG. 1 configured to implement a lossless compression on application data, wherein the compression method failed to decrease the size of the data in accordance with an exemplary embodiment of the present invention.

Turning to FIG. 3, a RAID controller configured to implement lossless compression techniques is illustrated in accordance with an exemplary embodiment of the present invention. Specifically, FIG. 3 illustrates the case where the lossless compression technique is unsuccessful in reducing the space required to store the user application data. An application write data block 22 arrives at the RAID controller 12, and two paths are provided for the write data block 22. A first path attempts to compresses the user application data using a lossless technique and a second path generates EDC data. Because the user application data is unable to be sufficiently compressed using lossless techniques, the user application data is provided in an uncompressed form to the array 16 and stored in a primary data area 42 of the storage array 16, while the EDC data is stored in a overflow data area 50, as will be discussed in greater detail below.

Metadata 44 is generated to indicate whether the lossless compression of the write data block 22 was successful. In a successful compression, the user application data is sufficiently compressed to allow for the storage of the metadata 44 and EDC data in the same block as the user application data. A successful compression may be indicated by a "1" in the metadata 44. In an unsuccessful compression, the user application data is not compressed sufficiently to allow for the storage of the metadata 44 and the EDC data to be stored in the same block as the user application data. An unsuccessful compression attempt may be indicated by a "0" in the metadata 44.

As mentioned above, if the compression is unsuccessful, the user application data is provided to the array 16 in uncompressed form. Because the metadata 44 is stored with the user application data and the user application data is 512 bytes, one byte of the user application data is stored with the EDC data in an overflow data area 50 if the compression is unsuccessful. Specifically, the metadata 44 and 511 bytes of the user application data are stored in a primary data area 42, while the EDC data and one byte of user application data are stored in an over flow data area 50.

In addition to indicating whether the compression was successful, the metadata 44 also indicates whether the EDC is stored in the same block with the user application data and may also indicate where the EDC data is stored. For example, a "1" may indicate that the EDC data is stored in the same block as the user application data, while a "0" in the metadata may indicate that the EDC data is stored in a separate block from the user application data. In the event, that the EDC data is stored in a separate block, for example in the over flow data area 50, the metadata 44 may also contain address or indexing information so that the EDC data may be located.

As mentioned above, the EDC data and one byte of over flow user application data may be stored together in a segment in an over flow data area 50. The over flow data area 50 may be on the same disk as the primary data area 42 or, alternatively, may be on a separate disk of the disk array 16. The blocks of the over flow data area 50 are configured to hold at least nine bytes, one byte of user application data and 8 bytes of EDC data. Accordingly, the blocks may be divided into 16 byte sectors allowing for 32 segments per block on standard sized blocks (512 bytes).

The correlation of the data stored at the over flow data area 50 with data stored at the primary data area 42 may be accomplished through a variety of means. For example, a particular location within the over flow data area 50 may be tied to a particular block of the primary data area 42. Alternatively, an addressing or indexing scheme may be implemented as mentioned above. For example, a primary data area index may be defined as K plus the number of the primary data block DIV 32, where K represents the first data block of the over flow data area 50 and DIV is a mathematical operator that divides the numbers and provides a whole number, ignoring any remainder or fraction. An over flow data area index may be defined as a primary data block index number MOD 32, where the primary data block index number is the block number in the primary data area and MOD is a mathematical operator that divides the numbers and provides the remainders. Alternative indexing, addressing, and association techniques may be implemented to allow for the data stored in the over flow data area 50 to be associated with its corresponding data stored in the primary data area 42.

When a read request for user application data that was unable to be compressed is received, the RAID controller 12 retrieves the user application data from both the primary data area 42 and the over flow data area 50. The user application data and the EDC data are provided to an EDC machine 32, and the RAID controller outputs a data validity indicator 36 along with the read data 34 for each read operation.

Figure 4:
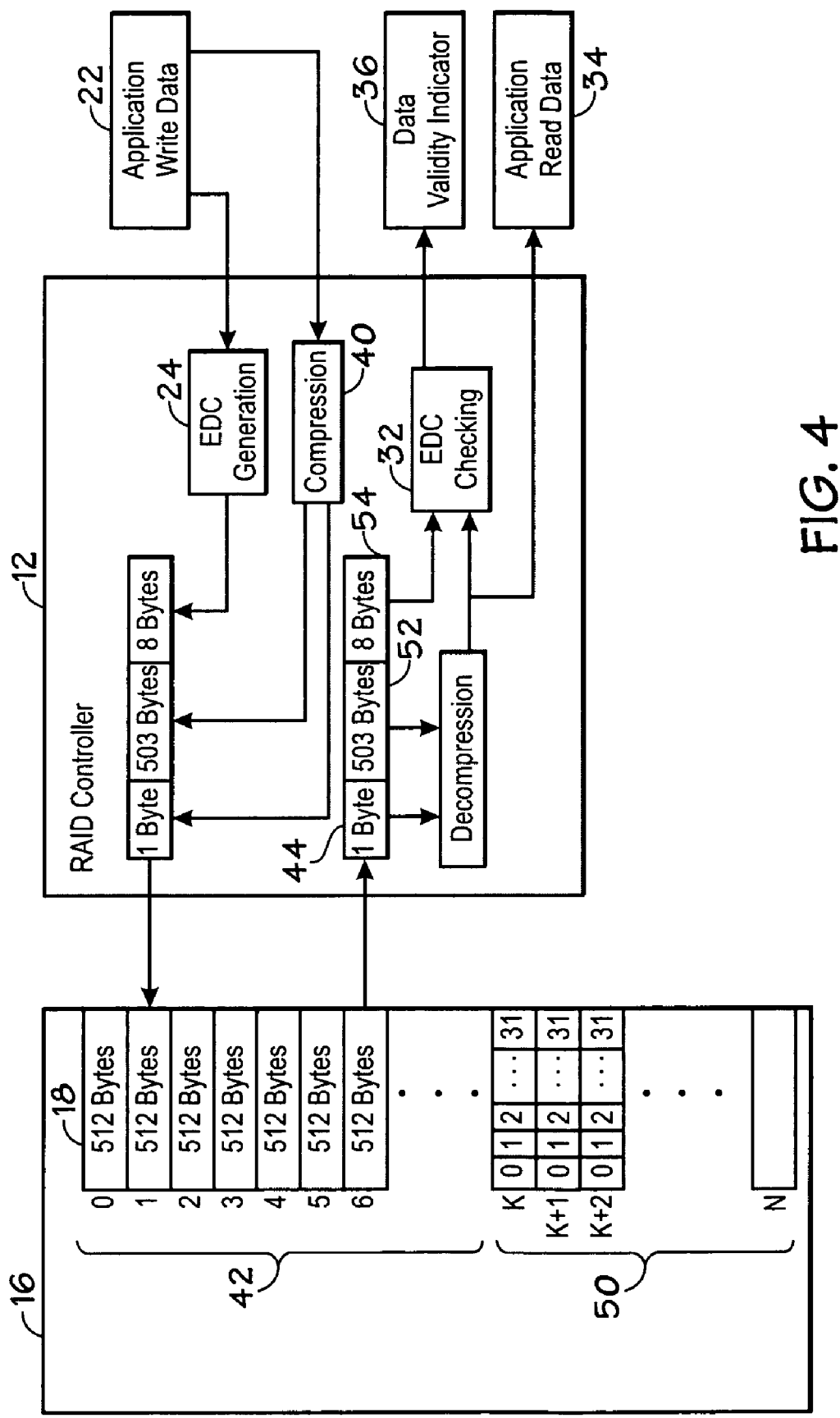
FIG. 4 illustrates a block diagram of the RAID system of FIG. 1 configured to implement a lossless compression on application data, wherein the compression method successfully decreased the size of the data in accordance with an exemplary embodiment of the present invention.

Turning to FIG. 4, a block-flow diagram of the RAID controller of FIG. 3 is illustrated in accordance with an exemplary embodiment of the present invention. Specifically, FIG. 4 illustrates the case where the lossless compression sufficiently compresses the user application data so that the metadata 44 and the EDC data may be stored in the same block as the user application data. Accordingly, the metadata 44 contains a "1," indicative of a successful compression and no data is stored in the overflow data area 50.

When a read request for successfully compressed user application data is received by the RAID controller 12, the metadata 44, the compressed user application data 52, and the EDC data 54 are read from the same block in the primary data area 42. The user application data 52 is decompressed, and the decompressed user application data and the EDC data 54 are provided to the EDC machine 32 to verify the data integrity. The RAID controller 12 provides a data validity indicator 34 and application read data block 36 to the requesting application.

Systems implementing the techniques disclosed herein may realize an increase in performance proportional to the fraction of user application data blocks that can be compressed sufficiently for the EDC data and metadata 44 to fit in the same block as the user application data. Additionally, the techniques disclosed herein allow for implementation on standard sized blocks, eliminating any need to reconfigure the block sizes and allowing for compatibility with all types of disk interfaces.

The invention claimed is:

1. A method of storing data comprising:
dividing a storage disk into a primary data area and an overflow data area, wherein the primary data area comprises standard sized blocks;
receiving a write request from an application;
generating error detection code (EDC) data for user application data associated with the write request;
compressing the user application data using a lossless compression technique to generate compressed user application data; and
storing the compressed user application data and the EDC data together in one of the standard sized blocks in the primary data area if the lossless compression technique is successful and storing the EDC data in the overflow data area if the lossless compression is unsuccessful.

2. The method of claim 1, comprising generating metadata indicative of whether the lossless compression was successful.

3. The method of claim 2, wherein generating metadata comprises producing a "0" if the lossless compression was successful and a "1" if the lossless compression was unsuccessful.

4. The method of claim 2, wherein the metadata is stored in the same block as the user application data.

5. The method of claim 1, comprising storing one byte of user application data with the EDC data.

6. The method of claim 1, comprising providing an index to correlate the data in the over flow overflow data area with corresponding data in the primary data area.

7. The method of claim 1 comprising:
receiving a read request from an application, and retrieving requested data from the primary data area;
determining if data is stored in the overflow data area;
retrieving requested data from the overflow data area if data is stored in the overflow data area;
decompressing the requested data if no data is stored in the overflow area;
producing a data validity indicator; and
providing the requested data and the data validity indicator to the application.

8. The method of claim 7, wherein determining if data is stored in the overflow data area comprises evaluating metadata.

9. A system comprising:
a redundant array of inexpensive disks (RAID) controller comprising:
an error detection machine configured to generate error detection code (EDC) data for received user application data; and
a compression circuit configured to losslessly compress the received application data to generate compressed user application data, wherein the RAID controller is configured to transmit the EDC data and the compressed user application data for storage together in a standard sized block in a primary area of a storage array if the compression of the received application data is successful and wherein the RAID controller is configured to transmit the EDC data to an overflow data area of the storage array for storage if the compression of the received application data is unsuccessful.

10. The system of claim 9, comprising a disk interface, wherein the disk interface comprises a small computer system interface.

11. The system of claim 9, comprising a disk interface, wherein the disk interface comprises fibre channel.

12. The system of claim 9, comprising a disk interface, wherein the disk interface comprises serial AT attachment.

13. The system of claim 9, wherein the storage array comprises semiconductor memory devices.

14. The system of claim 9, wherein the storage array comprises hard disk drives.

15. The system of claim 9, wherein the storage array comprises optical drives.

16. The system of claim 9, comprising a computer system communicatively coupled to the RAID controller, wherein the computer system is a personal computer.

17. The system of claim 9, comprising a computer system communicatively coupled to the RAID controller, wherein the computer system is a server coupled to a network.

18. A method of storing user application data comprising:
dividing a storage array into standard size blocks having 512 bytes each;
generating error detection code (EDC) data for user application data received during a write request, the EDC data comprising eight bytes of data;
compressing user application data using a lossless compression technique;
generating metadata to indicate whether the compression was successful; and
storing the metadata, compressed user application data, and the EDC data in one 512 byte sized block in a primary data area if the compression was successful, and if the compression was unsuccessful, storing the metadata and a portion of uncompressed user application data in the one 512 byte sized block in the primary data area and storing the EDC data and a remainder uncompressed user application data in an over flow data area.

19. The method of claim 18 comprising:
receiving a read request from a user application;
retrieving data from the primary data area in the storage array; and
determining if the data has been compressed,
if the data has been compressed, decompressing the data and generating a data validity indicator using the EDC;
if the data has not been compressed, retrieving data from the over flow data area and generating the data validity indicator using the EDC.

* * * * *

UNITED STATES PATENT AND TRADEMARK OFFICE
CERTIFICATE OF CORRECTION

| | | |
|---|---|---|
| PATENT NO. | : 7,840,877 B2 | Page 1 of 1 |
| APPLICATION NO. | : 11/590129 | |
| DATED | : November 23, 2010 | |
| INVENTOR(S) | : Michael B. Jacobson | |

It is certified that error appears in the above-identified patent and that said Letters Patent is hereby corrected as shown below:

In column 6, line 23, in Claim 6, before "overflow" delete "over flow".

In column 7, line 10, in Claim 18, delete "size" and insert -- sized --, therefor.

Signed and Sealed this

Seventeenth Day of May, 2011

David J. Kappos
*Director of the United States Patent and Trademark Office*